Sept. 27, 1960   W. WRIGLEY ET AL   2,953,858
NAVIGATIONAL APPARATUS

Filed March 5, 1954   5 Sheets-Sheet 1

INVENTORS
WALTER WRIGLEY
FORREST E. HOUSTON
JOSEPH E. DeLISLE
BY
ATTORNEYS

Sept. 27, 1960     W. WRIGLEY ET AL     2,953,858
NAVIGATIONAL APPARATUS

Filed March 5, 1954     5 Sheets-Sheet 3

INVENTORS
WALTER WRIGLEY
FORREST E. HOUSTON
JOSEPH E. DeLISLE
BY
ATTORNEYS

Sept. 27, 1960  W. WRIGLEY ET AL  2,953,858
NAVIGATIONAL APPARATUS
Filed March 5, 1954  5 Sheets-Sheet 4
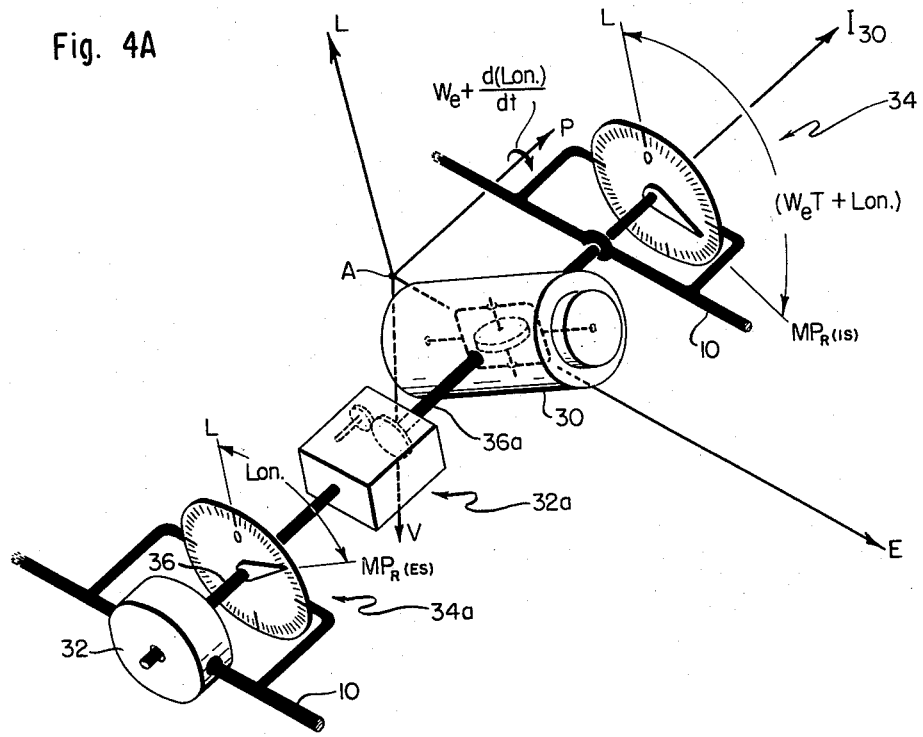
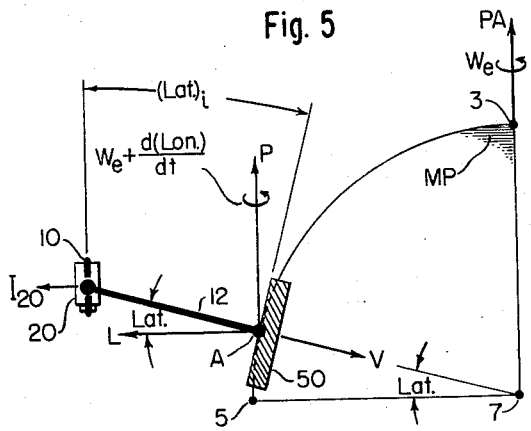
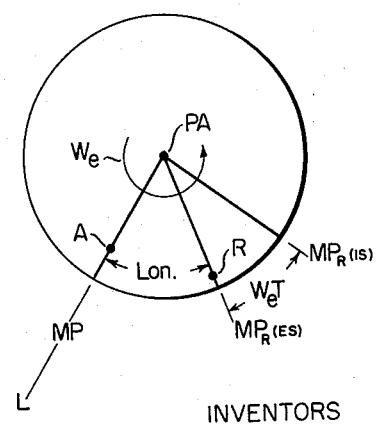
INVENTORS
WALTER WRIGLEY
FORREST E. HOUSTON
JOSEPH E. DeLISLE
BY
ATTORNEYS Sept. 27, 1960 W. WRIGLEY ET AL 2,953,858
NAVIGATIONAL APPARATUS
Filed March 5, 1954 5 Sheets-Sheet 5

INVENTORS
WALTER WRIGLEY
FORREST E. HOUSTON
JOSEPH E. DeLISLE
BY
ATTORNEYS

United States Patent Office 2,953,858
Patented Sept. 27, 1960

2,953,858

NAVIGATIONAL APPARATUS

Walter Wrigley, Wollaston, Forrest E. Houston, Westwood, and Joseph E. De Lisle, Arlington, Mass., assignors, by mesne assignments, to Research Corporation, New York, N.Y., a corporation of New York Filed Mar. 5, 1954, Ser. No. 414,338

2 Claims. (Cl. 33—204)

The present invention relates to navigation apparatus and more particularly to apparatus for indicating the position of a vehicle.

Conventional self-contained methods for indicating longitude and latitude generally center around using repeater servos to obtain information about the rate of change of latitude or longitude from water speed data and orientation information from the ship's gyrocompass. The servos position a member separate from the gyrocompass so as to indicate longitude and latitude. There are certain difficulties with such systems. Chiefly, since the system is essentially a dead-reckoning system, the errors which may occur from time to time in the position indication are cumulative. That is to say, such systems generally do not include a self-monitoring system, and the indication of latitude is not self-correcting. (Longitude, since it involves an arbitrary longitude reference, is not capable of such self-monitoring indication.) Furthermore, the difficulties associated with the two-degree-of-freedom gyro in the gyrocompass, such as gimbal friction and inertia and gimbal lock, are carried over into the indication of longitude and latitude.

It is one object of the present invention to provide a device which indicates longitude and latitude with greater accuracy than heretofore possible, said device being suitable for attachment to any gyrocompass, which provides data as to the vertical and east directions. (It is to be understood, however, that the present invention is more accurate when used with the preferred gyrocompass described herein.)

It is another object of the present invention to provide a device which seeks out latitude as a physical reference, thereby providing a self-monitoring indication.

It is also an object of the present invention to provide a complete navigational system in which the gyros may be made as interchangeable parts.

The preferred form of gyrocompass which is mentioned in the present invention is that disclosed in the copending application of Wrigley and Draper, Serial No. 258,416, filed November 27, 1951. This form of gyrocompass is fully described in that application and a brief supplementary description will be given below.

In furtherance of the above objects, a principal feature of the present invention is the use of single-degree-of-freedom gyros. The construction of this type of gyro permits an apparatus with greater accuracy than the two-degree-of-freedom gyroscope does, because the axial-type bearings used in the single-degree-of-freedom gyro permit the center of mass of the gyro to be more accurately positioned than the gimbal bearings of a two-degree-of-freedom gyro.

Another feature is the use of these gyros in combination with a servomechanism, so that no energy is taken from the gyro, but merely a signal which activates the servo which does the work. This results in far less error due to drift.

When the longitude and latitude indicator of the present invention is combined with the preferred form of gyrocompass two other features result. First, it becomes possible to eliminate the need for a separate gyro to detect latitude, and second, interconnections can be made between the latitude indicating system and the gyrocompass which completely eliminate from the combined system errors due to constant north and south velocities.

The present invention will be disclosed in the following manner. First, the navigational problem in general will be described. Second, the method and apparatus for indicating latitude will be described and third, the method and apparatus for indicating longitude. Finally, the combination of the longitude and latitude apparatus of the present invention with the preferred form of gyrocompass will be described.

In general, it is to be understood that all gyrocompasses presently known include a member which is oriented both with respect to the vertical and with respect to east (that is, some chosen direction in the horizontal plane). The present invention makes use of this indication of the vertical and of east as follows: the meridian plane is defined as the plane normal to the east direction, and therefore a latitude-indicating member may be mounted on this east-indicating member in the gyrocompass, so that the latitude-indicating member lies in the meridian plane. The present invention provides a velocity-sensitive detecting device (in the first embodiment, a single-degree-of-freedom rate gyro), oriented in the meridian plane which seeks out a direction in that plane along which no component of the earth's rotational velocity is felt. The angle between this direction and the vertical is a measure of the latitude.

Longitude is the angle between the meridian plane containing this direction and a reference meridian plane such as the meridian plane at Greenwich. The present invention provides means for remembering the direction in space of the meridian plane containing this null-velocity line at some reference point on the earth's surface. Longitude is indicated by measuring the angle about the polar axis between the reference meridian plane and the meridian plane at the position of the indicating apparatus.

The preferred form of gyrocompass makes use of single-degree-of-freedom gyros and pendulums to seek out an equilibrium position in which one of its axes is east and another is vertical. The east and vertical directions determine the meridian plane and thereby permit a latitude-indicating member to be mounted on the gyrocompass member, so that it is rotatable in the meridian plane. A detector of angular velocity is mounted on the latitude-indicating member and connected to a servo to form a feedback loop which rotates the latitude-indicating member until it is aligned with a line in the meridian plane about which no velocity is sensed. The angle between that line and the vertical is an indication of latitude. The use of a negative-feedback loop provides a continuously self-monitoring indication of latitude.

The above features and others will appear in the accompanying drawings.

Fig. 4A shows an improvement in the longitude-indicating apparatus of Fig. 4.

Figs. 5 and 6 are illustrative drawings showing the relations of the member of Fig. 4 to the navigational problem shown in Figs. 1 and 2;

The navigational problem

Fully stated, the navigational problem is to indicate the position of a vehicle on the earth's surface (that is, its longitude and latitude) and its directional orientation and its rate of travel. Since the rate of travel can be obtained by vector addition of the rate of change of longitude and latitude, the problem may be reduced to finding the directional orientation of the vehicle, its position in longitude and latitude and its rate of change of longitude and latitude. The directional orientation is obtained from the gyrocompass and therefore the present invention is primarily directed toward determining the rate of change of longitude and of latitude and the instantaneous position in longitude and latitude.

Figure 1:
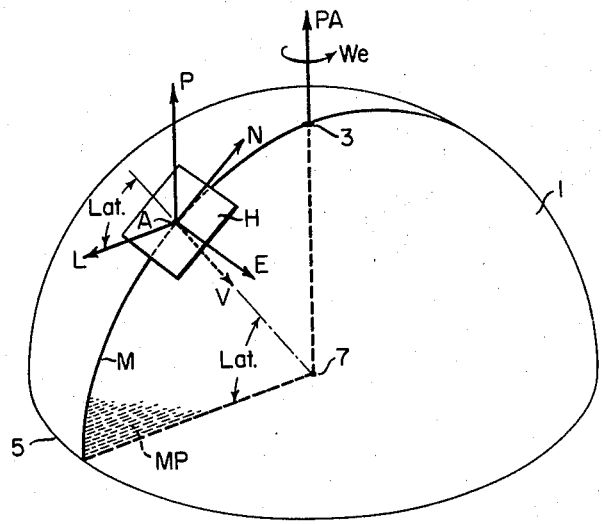
Figs. 1 and 2 are illustrative drawings of the earth, showing the physical directions which are important in the navigational problem and its solution.

Fig. 1 shows the northern hemisphere of the earth 1 with its north pole at 3 and the equator at 5. The earth rotates from west to east about its polar axis (shown at PA) at the sidereal rate, indicated as $W_e$. A point on the earth is shown at A for purposes of illustration. At H is shown the horizontal plane containing the point A, that is, the plane which is perpendicular to the vertical V drawn from the point A to the center of the earth. Within the horizontal plane lie the north direction N and the east direction E. The meridian plane shown at MP is a plane which contains the vertical V through the point A and the polar axis PA. The meridian line is the great circle from the north pole to the south pole which includes the point A. This is shown at M, and it will be seen that the north direction N is tangent to M at the point A. The polar direction P is indicated at the point A as a line parallel to the polar axis PA. The sidereal rate of the earth will be sensed at A around the axis P, and a component of this velocity will be sensed along the north direction N in the horizontal plane H. The latitude null line L for the point A is defined as that line which lies in the meridian plane and is perpendicular to the direction P. Since the latitude null line L and the east direction E are perpendicular to the direction of the polar axis P, no component of the earth's rotational velocity $W_e$ will be felt along these two lines or in the plane which contains these lines, since that plane is perpendicular to the direction of the polar axis. Latitude is the angle that the point A is above the equator 5. From Fig. 1, this can be seen to be equal to the angle between the latitude null line L and the vertical V. The present invention makes use of the indication of the vertical provided by the stable element of the gyrocompass, and in turn detects the latitude null line L by finding the direction in the meridian plane MP along which no component of the earth velocity $W_e$ is sensed. The angle between V and L so detected is then the indicated latitude.

Figure 2:
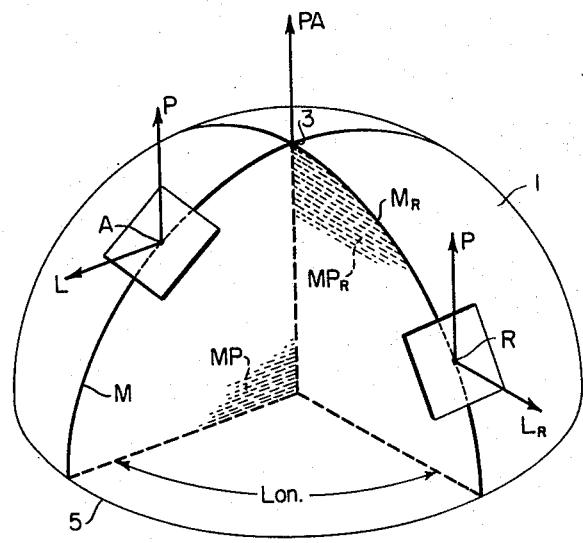

Fig. 2 shows the northern hemisphere of the earth in the same way as Fig. 1, with the point A at which the navigational apparatus is assumed to be. A point R is also shown which lies in the meridian plane $MP_R$ along the meridian line $M_R$. This point R is considered as a reference point for the measurement of longitude. It may be a standard reference, such as Greenwich, England, or the last definitely known position of the vehicle, or any other suitable reference. In any case longitude is measured as the angle around the polar axis PA between the points R and A. This angle can be measured conveniently as the angle between the meridian plane MP at the point A and $MP_R$ at the point R. The present invention "remembers" the direction of $MP_R$ and indicates the angle between $MP_R$ and MP as the indicated longitude.

The general technique used in the present invention for determining the various directions V, P, L, N, H, and E is as follows. First, the directions V (and therefore H) and E (and therefore N) are known from the stable element and gyrocompass. Second, a member is mounted on the gyrocompass so that it is rotatable with respect to the meridian plane about the east direction (preferably, although all other directions, except north, are possible). Third, a unit is provided to detect angular velocity about an input axis parallel to the member, such as a rate gyro mounted on the member or rate gyros mounted on the gyrocompass and their outputs multiplied by trigonometric functions of the indicated latitude. An error signal is thus obtained and used to activate a servo to rotate the member until it senses no velocity. Thus, its input axis is lined up with L (and therefore P, normal to L). Latitude is then known as the angle between V and L.

An integrating gyro is provided to "remember" the position of a reference meridian plane $MP_R$ about the polar direction P. Then, the angle between the MP indicated by the velocity-sensitive gyro and $MP_R$ indicated by the integrating gyro is the astronomical longitude.

The integrating gyroscope

Figure 3:
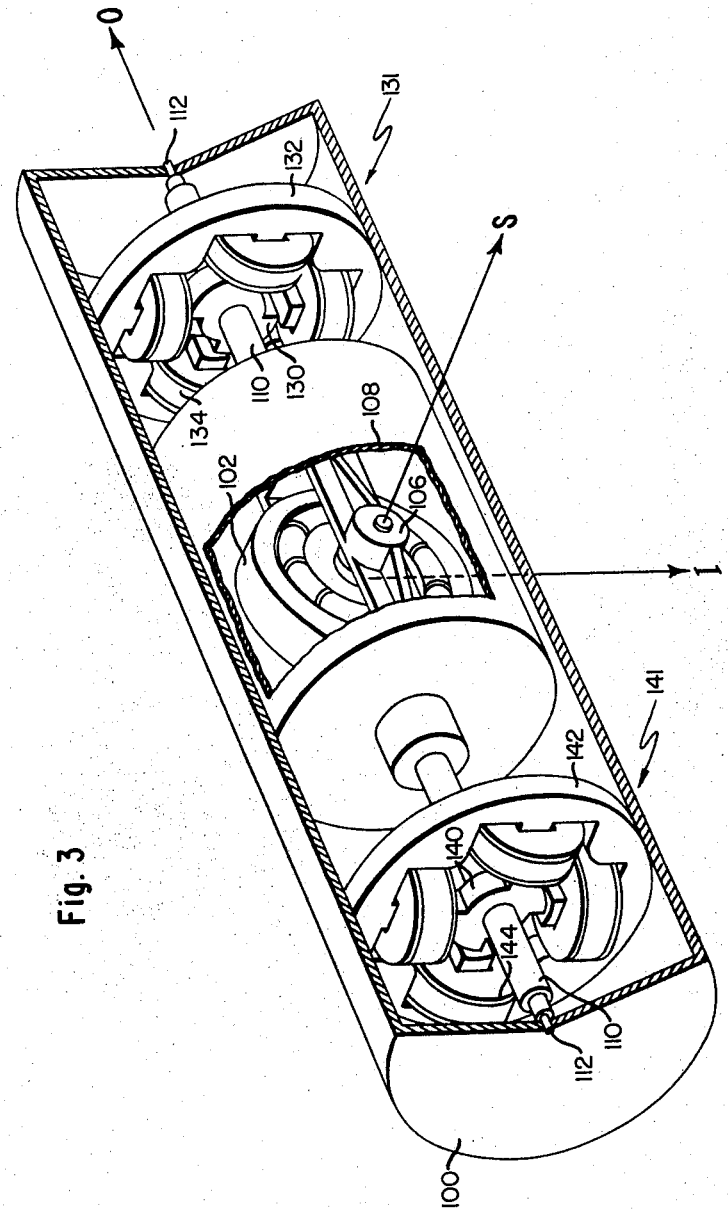
Fig. 3 is a cutaway view of a preferred form of single-degree-of-freedom gyroscope.

Both the velocity-sensitive gyro unit and the integrating gyro are single-degree-of-freedom gyros, preferably of the construction shown in Fig. 3. This construction is described in detail in the copending application of Jarosh, Haskell and Dunnell, Serial No. 210,246, filed February 9, 1951, now Patent No. 2,752,791, granted July 3, 1956. The assembly of Fig. 3 is mounted in a case 100 by means of the axial bearings 112. The gyro rotor 102 is mounted, free to spin, in the frame 106 which is attached to the shaft 110 which rotates in the bearings 112. Also mounted on the shaft 110 is a chamber 108 containing the gyro rotor and frame. The chamber is shaped so there is only a small clearance between it and the case. The case is filled with a viscous fluid (not shown) to resist rotations of the chamber and thus to damp deflections of the frame 106 and rotor 102 with respect to the case. Furthermore, the shaft 110 carries a signal generator 131 and torque generator 141. The signal generator is shown as a rotor 130, with stator 132 and stator windings 134 rigidly attached to the case; the torque generator is likewise shown as a rotor 140, with stator 142 and stator windings 144 rigidly attached to the case. Both units are preferably of the type described in the U.S. Patent No. 2,488,734 of Mueller, issued Nov. 22, 1949. When a reference voltage is applied to the signal generator windings 134, the device produces an output voltage proportional to the deflection of the rotor 130 (and shaft 110) from a neutral position with respect to the stator 132 (and case 100). The torque generator produces a torque proportional to the current input to its windings 144, tending to rotate its rotor 140 (and shaft 110) with respect to its stator 142 (and case 100).

The operation of the single-degree-of-freedom gyroscope will now be explained. The gyro rotor spins about the spin axis S. The rotor, when it senses an angular velocity, will exert reaction torques against its frame 106, but, since the frame is rotatable only in the axis of the bearings 112, the only torque which causes rotation of the gyro element is a torque about the output axis O. It is well-known that the reaction torque of a gyro is perpendicular to the spin axis and the axis about which the gyro is rotated. Therefore, since the reaction torque of the gyro to cause output rotation is about the axis O, only motion about the input axis I (perpendicular to the spin axis S and output axis O) causes output rotation. This deflection is picked up by the signal generator 131 and converted to an electrical output. Thus, the gyro unit operates in such a way that motion of the case 100 about the input axis I produces an electric output from the signal generator 131.

The purpose and operation of the damping will now be explained. If the case 100 is rotated about the input axis I through an angle $\alpha$, a reaction torque is generated tending to rotate the gyro rotor about its output axis O. The magnitude of this torque is $$H\frac{d\alpha}{dt}$$

where H is the angular momentum of the gyro rotor, and $$\frac{d\alpha}{dt}$$

the angular velocity of motion about the axis I. This output torque is opposed by the damping torque which is $$C\frac{d\theta}{dt}$$

where C is the damping coefficient, $\theta$, the angle through which the shaft 110 moves and $$\frac{d\theta}{dt}$$

the angular velocity of the frame 106 and rotor 102 about the axis O. At equilibrium, these torques balance.

(1) $$H\frac{d\alpha}{dt}=C\frac{d\theta}{dt}$$

The angle $\theta$ can be expressed:

(2) $$\theta=\frac{H}{C}\int\left(\frac{d\alpha}{dt}\right)dt=\frac{H}{C}\alpha$$

$\theta$, the output deflection of the gyro is proportional to the time-integral of the angular velocity or rate about the input axis (which is why this type of gyro is referred to as a "rate-integrating gyro"); $\theta$ and the output of the signal generator 131 are therefore proportional to $\alpha$. The output of the gyro unit is proportional to its angular deflection about the input axis I. Therefore the gyro, once deflected, does not reach zero output unless it is returned to its former position about the input axis I.

The damping also operates to produce integration of the torques applied by means of the torque generator 141. If a torque $T_g$ is applied through the torque generator, it is resisted by the damping torque $$C\frac{d\theta}{dt}$$

and the gyro element achieves constant velocity when (3) $$\frac{d\theta}{dt}=\frac{T_g}{C}$$

Therefore, (4) $$\theta=\frac{1}{C}\int T_g dt$$

The gyro output deflection $\theta$ (and therefore the signal output of the unit) is proportional to the time-integral of the torque imposed by the torque generator; since, in the preferred form of torque generator, this torque is proportional to the current input to the torque generator, the gyro unit output is proportional to the time-integral of the gyro unit current input. The gyro is ordinarily connected to a servo which moves the gyro about its input axis until the gyro output is zero. In order to keep the gyro output zero when a torque is applied, the servo must move it at a rate proportional to the applied torque (and input current). Thus, the gyro-servo combination acts as a velocity drive, moving the gyro at a velocity proportional to the gyro input current. Another use for the torque generator is to apply a definite torque to the shaft to compensate for gyro drift, which is precalibrated for each gyro. The torque generators do not form a necessary part of the computing system for the latitude annd longitude gyros shown at 20 and 30 in Fig. 4 and hence are not shown in that figure, although they might be used for drift compensation.

The above description has shown how the preferred gyro unit shown in Fig. 3 is rate-integrating. Such a gyro unit can also be made rate-sensitive, that is, the deflection $\theta$ is made proportional to the angular velocity $$\frac{d\alpha}{dt}$$

about the input axis, rather than the angular deflection $\alpha$. In order to do this, means are provided to resist rotations of the shaft 110 by a torque $K\theta$ proportional to the shaft deflection $\theta$. The gyro element comes to rest when its reaction torque $$H\frac{d\alpha}{dt}$$

(where H is the angular momentum of the rotor 102) equals the resisting torque $K\theta$. In such a case, (5) $$\theta=\frac{H}{K}\left(\frac{d\alpha}{dt}\right)$$

The output deflection of the frame 106 and rotor 102 and the output signal from the signal generator 131 are proportional to the angular velocity of the gyro unit as a whole about the input axis I.

Means for producing such a $K\theta$ resisting torque may be a spring active between the shaft 110 and case 100 or a "stiffness generator" as described in the above-mentioned Mueller patent. However, for the preferred form of gyro unit shown in Fig. 3 a particularly convenient method is to provide a coupling network to adapt the signal generator output to act as the torque generator input. Since the signal generator output is proportional to the shaft deflection $\theta$ and the generated torque is proportional to the current input to the torque generator, if the coupling network makes the torque generator input proportional to the output of the signal generator, a resisting torque is produced proportional to the deflection of the frame 106 and rotor 102.

A more complete description of the means for making the gyro unit of Fig. 3 velocity-sensitive, will be found in the copending application of Draper, No. 239,978, filed August 2, 1951, now Patent No. 2,752,790, granted July 3, 1956. A more complete description of the construction and operation of the gyro unit of Fig. 3 will be found in the above-mentioned Patent No. 2,752,791 of Jarosh, Haskell and Dunnell.

*Latitude detection*

Figure 4:
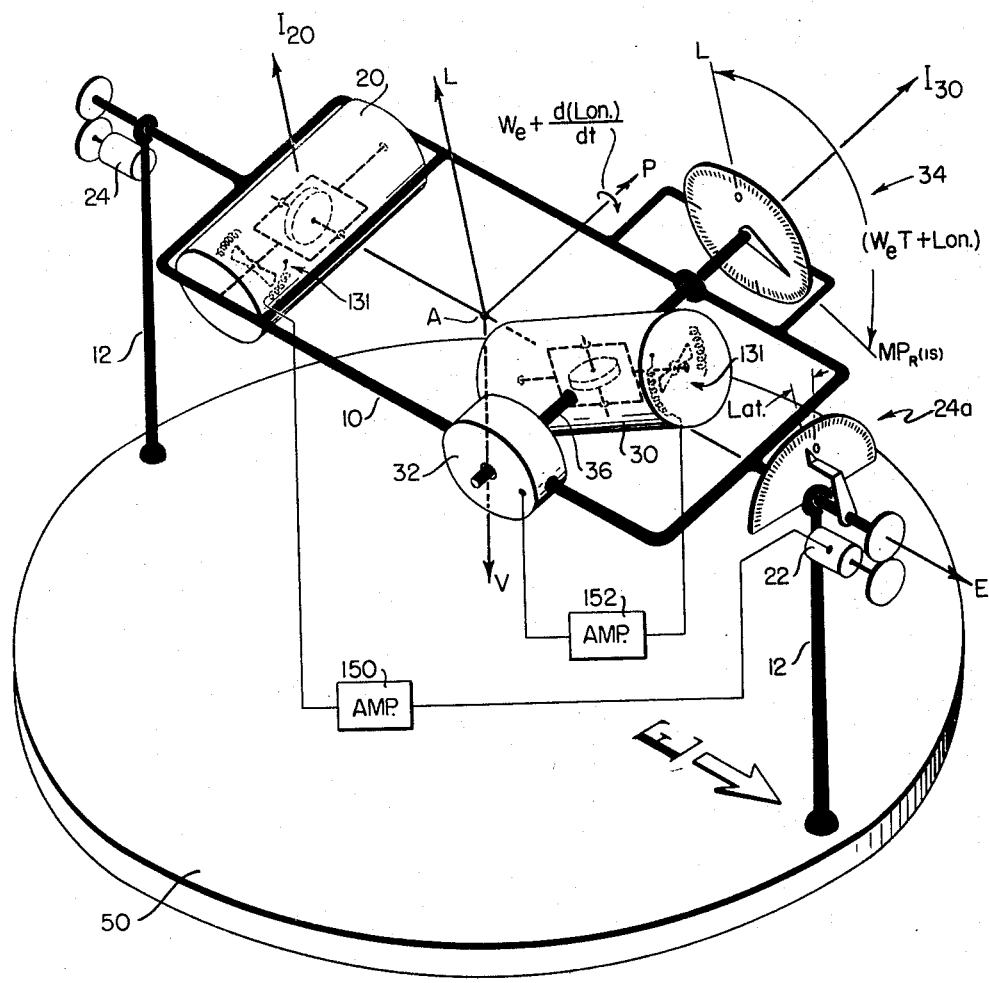
Fig. 4 shows a preferred form of longitude-and-latitude-indicating member according to the present invention.

Fig. 4 shows a member 10 which carries gyros of the type described above. The member 10 is oriented with respect to the polar direction P and the latitude line L by means of the gyro 20 which is connected as described above so that it is rate-sensitive. The gyro 30 is an integrating gyro, used to remember the reference $MP_R$ direction, for purposes of indicating longitude. The member 10 is supported by two vertical support members 12 on a base 50 which comprises a horizontal table having a line therein pointing east. This table may be supplied by a gyrocompass, preferably a gyrocompass of the type described in the Wrigley and Draper application Serial No. 258,416, filed November 28, 1951. The member 10 is mounted so that it is rotatable in its support members 12 about the east direction E. Active between the support members and the member 10 is a servomotor 22 which is activated by the output from the gyro unit 20. The servo rotates the member 10 about the east direction. Since the east direction is normal to the meridian plane, any point on the member 10, as it is rotated about the east direction, sweeps out the meridian plane. At the other end of the member 10 is an angle indicator 24, so mounted that it indicates the angle between the member 10 and its support members 12. As shown in Fig. 4 the normal to the plane of the member 10 is parallel to the latitude null line L, and the member 10 itself includes both the polar direction P and the east direction E. The support members 12, being mounted perpendicularly to the horizontal member 50 of the gyrocompass, are therefore vertical. The angle between the member 10 and its support members 12 is therefore the co-latitude. The unit 24 serves to indicate the angle. It may be a repeater servo to indicate this angle at some other point, or a suitable dial and pointer 24a may be used to indicate latitude. For reasons to be described below, it is useful to obtain the sine or cosine of latitude. For that purpose, the unit 24 may be an angle resolver, which is an instrument that multiplies an electric input by a selected trigonometric function of its rotor-to-stator angle, in this case the co-latitude.

The gyro unit 20 is a single-degree-of-freedom gyro such as that shown in Fig. 3 and is oriented on the member 10 so that its input axis $I_{20}$ is perpendicular to the plane of the member 10. Thus, as described above, as the member 10 is rotated about the east direction, the input axis $I_{20}$ sweeps out the meridian plane. This is shown in somewhat more detail in Fig. 5. In Fig. 5 the member 50 represents the horizontal and east stable element of a gyrocompass. It is shown in its relative orientation to the meridian plane at the point A of Fig. 1. The support member 12 is normal to the member 50 and carries the latitude-indicating member 10. The latitude of the point A is the angle between the vertical at the point A and the latitude null line L; the vertical is indicated by means of the member 50 and the support members 12.

The gyro unit 20 causes the member 10 to indicate the latitude null line L. As shown in Fig. 5, the meridian plane is rotated once a day about the polar axis PA at the earth rate $W_e$, and the navigational apparatus is rotated at the point A about the polar direction P at a rate which is the earth rate $W_e$ plus the rate of east-west travel, that is, $$W_e + \frac{d(\text{Lon})}{dt}$$

Along the latitude null line L no component of this rotation is felt because L is perpendicular to P. From Fig. 1 it may be seen that there is no other rotation about the line L, so that if the input axis $I_{20}$ of the rate gyro 20 is parallel to the latitude null line L it senses no rotation and has zero output. It can be seen from the geometry of Fig. 5 that if the input axis $I_{20}$ is displaced from its proper position parallel to L, it senses a component of the earth's rotation plus the east-west travel of the vehicle which is proportional to the sine of the angle between $I_{20}$ and L. For small angles, this means that the output of the gyro unit 20 is proportional to the deflection of the input axis $I_{20}$ from the latitude null line L. This output, therefore, is a suitable input to the servo 22 (Fig. 4). As shown diagrammatically in Fig. 4, the electrical output of the signal generator 131 of the gyro unit 20 is fed through an amplifier 150 to the servo motor 22, whereby the motor drives the frame member 10 in a direction to bring the input axis $I_{20}$ to a position perpendicular to the polar axis when the signal generator output is nulled. It will be noted that in the arrangement shown in Fig. 4, the spin axis of the gyro unit 20 is along the east axis when the output is nulled. Stated in another way, the output from the gyro 20 activates the servo to move the member 10 until the input axis $I_{20}$ is parallel to L, producing zero output and causing the servo to cease moving the member 10. As can be seen from Fig. 5, the indicated latitude $(\text{Lat})_i$ is shown as the angle between the member 10 and the member 50.

A number of advantages are obtained by combining a latitude measuring device with a gyrocompass. For example, the inherent gyrocompass error due to a north or south velocity of the vehicle can be readily compensated or accounted for. The north-south velocity is the rate of change of latitude, which can be readily determined from readings of the latitude indicator, and this velocity can be used to move or set the compass card, either automatically or manually. Moreover, the gyrocompass error signal is proportional to the cosine of the latitude; that is, a gyrocompass is most accurate at the equator, and gives no useful reading at the poles. Some compensation for this condition can be obtained by multiplying the gyrocompass error signal by the secant of latitude, which can be obtained either automatically or manually from the latitude indication.

Although the frame 10 may be mounted on any support which is stabilized to the vertical and in azimuth (represented by the member 50), the preferred mounting is on a gyrocompass which also utilizes single-degree-of-freedom gyros, as will be presently described.

Longitude indication

The frame 10 also carries the gyro 30 used for indicating longitude. Longitude differs from latitude in that the latter is a unique physical quantity which can be detected (as by the gyro 20) whereas longitude involves an arbitrary reference which must be "remembered." For this purpose an integrating gyro 30 is provided. As described above, an integrating gyro has zero output only when its net deflection from its original position in space is zero and, hence, if its output is kept zero it "remembers" a fixed position in space. The gyro 30 is mounted on the frame 10 with its input axis $I_{30}$ perpendicular both to $I_{20}$ and to east so that its stabilized direction is parallel to the polar direction P as shown in Fig. 4. The gyro 30 is mounted along the shaft 36 which is rotatable in the member 10 so that the gyro is itself rotatable about its input axis $I_{30}$. A servomotor 32 is provided to rotate the gyro 30 about the axis $I_{30}$ with respect to the frame member 10. The output of the signal generator 131 of the gyro 30 is fed through an amplifier 152 to the servomotor 32. The action of the servomotor is to maintain the gyroscope in such a position that the output deflection is nulled, or very nearly so, and hence the gyro maintains its original orientation in space. The relative motion of the gyro with respect to the member 10 may be indicated in any suitable manner, as represented diagrammatically by the dial and pointer 34.

The rotation which is sensed about the axis P, and therefore about the input axis of the gyro 30, is the earth rate plus the rate of change of longitude, that is, the east-west motion of the vehicle. The sum of these two represents the rotation of the navigational apparatus about the P axis with respect to inertial space. The gyro 30 will activate its servo 32 so that it remains fixed in space. Therefore, the gyro will seem to an observer to rotate with respect to the member 10 at the earth's rate plus the rate of change of longitude. Actually the net motion of the gyro 30 with respect to space is zero. The member 10, however, as described above will rotate with the earth and vehicle with respect to space. Thus, the dial and pointer 34 in Fig. 4 will indicate changes in "celestial" longitude; in other words, the amount which the member 10 has rotated with respect to space during a given east-west travel. This angle of rotation equals the earth's sidereal rate times the elapsed time since the reference was taken, plus the change in earth longitude as the navigational apparatus was carried over the earth's surface by the motion of the vehicle.

This operation may be made somewhat clearer by a reference to Fig. 6, representing a top view of the northern hemisphere of the earth shown in Figs. 1 and 2. The points A (the vehicle position) and R (the reference point of known longitude) are shown together with the meridian planes at the two points. There are two directions associated with the meridian plane at the reference point R. The first of these is the direction of the plane for the point R in earth space, that is, the plane which rotates around the polar axis with the point R so that it always bears the relation to the point R shown in Fig. 2. This is referred to as $\text{MP}_R(\text{ES})$, the meridian plane for the reference point R in earth space. The angle between this earth space reference plane and the meridian plane for the point A is the change in longitude, that is, the angle between A and R measured around the polar axis PA.

The other direction associated with the meridian plane for the reference point R is the direction the meridian plane had when the reference was established. This is a direction which is fixed in space and does not rotate as the earth rotates. Therefore, the angle between $L_R$ in earth space and in "fixed" space is simply the sidereal rate times the elapsed time since the "fixed space reference" was established. This reference to space is equivalent to a star sight. (For example, suppose that at the time the reference was established a line in the meridian plane was parallel to a line of sight to the star Arcturus. Then, the direction of that line with respect to space remains fixed as the earth rotates and as the vehicle moves over the earth.) This "fixed" plane is referred to as $MP_R(IS)$, the meridian plane of the reference point R in inertial space. It is this second direction which the gyro 30 "remembers."

Since the integrating gyro is sensitive to rotations with respect to inertial space, it holds a position about the axis P represented by a line in the meridian plane at the instant the reference was established, $MP_R(IS)$. This direction remains fixed in inertial space as the earth rotates and as the vehicle moves over the earth. The angle between $MP_R(IS)$ and $MP_R(ES)$ is simply the sidereal rate times the time elapsed since the reference was established. The member 10 indicates the latitude line L and meridian plane MP at the point A; the gyro 30 indicates $MP_R(IS)$, meridian plane in inertial space of the reference point R. The angle between these two is shown on the dial and pointer 34 in Fig. 4, and represents the sum of (Lon), the change in longitude, and the angle between $MP_R(IS)$ and $MP_R(ES)$. The angle between these earth space and inertial space reference meridian planes can be obtained from a chronometer and subtracted from the dial reading on the dial 34, to give the change in longitude.

A preferred system for doing this automatically is shown in Fig. 4A. In the apparatus shown in Fig. 4A a time drive is inserted to subtract the earth's sidereal rate from the indication for astronomical longitude so as to give an automatic indication of earth longitude. The gyro is carried on the member 10, as before, rotatable by a servomotor 32 rotating the shaft 36. Between the gyro 30 and the shaft 36 is inserted a time drive 32a and shaft segment 36a which rotates the gyro 30 with respect to the shaft 36 at the sidereal rate of the earth with respect to the stars ($W_e$). A second dial and pointer 34a is shown for illustrative purposes. The gyro generates an output to activate the servo 32 such that the gyro remains fixed in inertial space about its input axis $I_{30}$. In order to remain fixed in space the gyro must be rotated by the servo 32 and the time drive 32a with respect to the member 10 at a rate equal to the sidereal rate plus the rate of change of earth longitude. The time drive 32a rotates the gyro at the sidereal rate without requiring an output from the gyro. The only output that the gyro now generates is the rate of change of longitude and this output activates the servo 32 to move the shaft 36 through an angle equal to a change in earth's longitude, which will be shown on the dial and pointer 34a. The total rotation of the gyro with respect to the member 10, that is, the change in astronomical longitude is shown as before on the dial and pointer 34. It will be seen that the sidereal component has been subtracted out automatically to give an indication of earth longitude directly.

The preferred gyrocompass

Figures 7, 8:
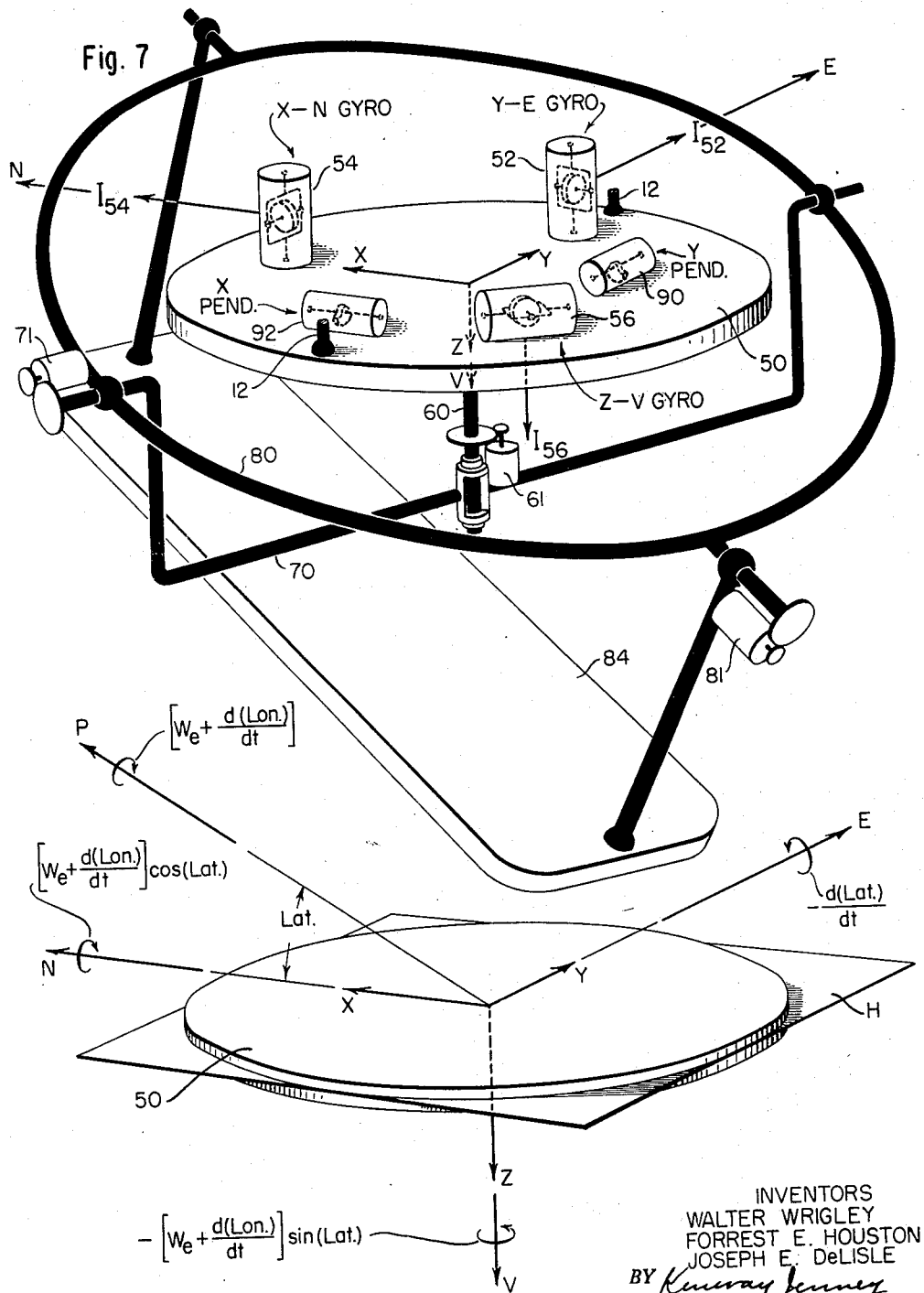
Fig. 7 shows the vertical and east indicating member of the preferred form of gyrocompass with its associated gyroscopes and pendulums.
Fig. 8 shows the various components of earth motion and vehicle motion sensed by the gyrocompass along its critical axes.

Fig. 7 shows a preferred form of gyrocompass.
Fig. 8 shows the angular velocities sensed about various axes of the gyro compass. The latitude and longitude indicating member of Figs. 4 and 4a may be mounted on any gyrocompass of present-day design, but the gyrocompass of Fig. 7 is preferred for two reasons: first, it uses single-degree-of-freedom gyroscopes of the same type used in the longitude and latitude indicating system, thereby facilitating repair and replacement; second, this gyrocompass may be adapted to receive from the longitude-latitude system corrections for north and south vehicle travel, thus making a gyrocompass free of errors due to steady-state errors in the compensation for northerly and southerly errors. The preferred form of gyrocompass is that described in the copending application of Wrigley and Draper, Serial No. 258,416, filed November 27, 1951, and the following brief description is to be supplemented by a reference to that application. Similar reference characters have been used to facilitate comparison.

The member 50 of Fig. 7 carries the gyros and pendulums which are used to detect the east direction and the vertical. The member 50 is mounted in gimbals 60, 70 and 80 to give it three degrees of freedom about axes X, Y and Z. The gimbals are provided with servomotors 61, 71 and 81 so that the member 50 may be rotated about any one or more of the three directions in response to electric inputs to the servos. These electric inputs are derived from signal generators in the gyro units 52, 54 and 56. (These gyros are of the same type as that shown in Fig. 3.) The gyros 52, 54 and 56 are mounted on the member 50 so that their input axes form a set of orthogonal coordinates, and the gyros detect any motion away from the original position of the member 50 with respect to these coordinates and activate the servos to move the member back to that position. Thus, the member is stabilized in inertial space against roll, yaw, and pitch motions of its supporting vehicle.

It is necessary, however, to orient the member 50, not in inertial space, but in earth space, so that its Y axis indicates east and its X axis north and its Z axis is vertical. The X and Y pendulums are used for this purpose. The pendulums as shown are single-degree-of-freedom pendulums; that is, they comprise a case containing an axial shaft to which a pendulous mass is attached. Thus, each pendulum is sensitive to gravity and acceleration forces in one plane only, the plane normal to the axial shaft. These axial shafts are lined up parallel, respectively, to the input axes of the X and Y gyros. The gyros are provided with torque generators as shown in Fig. 3, and the pendulums are used to activate these torque generators.

If the member 50 is not horizontal, one or both of the pendulums will hang at an angle from their neutral position in their cases. A signal generator is included in the pendulum cases to generate a signal proportional to this angle, and this signal is used to activate the torque generators in the gyro units. These torque generators tend to deflect the gyros and activate the servos to move the member 50 to a horizontal position. Thus, the member 50 is not monitored to inertial space, but to earth space.

Schuler tuning is provided by a series of electrical components, which cause the pendulums to act as if they had an 84-minute period. Mathematically, it can be shown that an 84-minute pendulum hangs to true vertical, when properly set, regardless of accelerations of its support. Schuler tuning is provided between the signal from the pendulum unit and the torque generator input to the gyro unit so that a true indication of vertical is provided in the presence of horizontal accelerations which deflect the pendulums from true vertical.

The input to the Y gyro 52, if its input axis $I_{52}$ is lined up to east, is zero (neglecting northerly and southerly motion of the vehicle), because no component of the earth's rotation lies along the east direction. If the Y axis of the member 50 is not lined up to east (and therefore the input axis $I_{52}$ of the Y gyro is not lined up to east) the Y gyro receives an input which is proportional to the deviation from east. Therefore, the input to the Y gyro is a satisfactory error signal for lining up the member 50 to east.

This error signal is imposed on the torque generator in the Z gyro, so that the Z gyro is deflected and the Z servo is activated to rotate the member 50 about its vertical axis Z until the member 50 is again lined up to east. Thus, a gyrocompass is formed. In effect, the pendulum-gyro combination 90, 52 and 56 seeks out a condition in the horizontal plane where no component of the earth's rotation is sensed along the input axis to the gyro 52. The only direction in the horizontal plane in which this is so is the east-west direction. Since the member 50 is thus continuously oriented to the vertical and to east it provides a satisfactory member on which the longitude-latitude indicating member of Fig. 4 may be mounted. The proper position for mounting the member is shown by the support members 12.

Fig. 8 shows the various components of angular velocity sensed by the gyros about their input axes. The vehicle is rotated with the earth about the polar axis P at a rate $W_e$. Its own rate of travel is the vector sum of the rates of change of latitude $$\frac{d(Lat.)}{dt}$$

and longitude $$\frac{d(Lon.)}{dt}$$

Therefore, as described above, the longitude gyro 30 (Fig. 4) senses the angular velocity $$W_e + \frac{d(Lon.)}{dt}$$

The position of gyro 30 represents to time-integral of this quantity. By "subtracting" from the position of gyro 30 the angle $W_e T$ that the earth has rotated in the elapsed time T, longitude is obtained.

The latitude gyro 20 (Fig. 4) is perpendicular both to the east axis E and the polar axis P and hence senses no angular velocity except as the result of an error in the indication of latitude or east or the vertical.

The X and Z gyros sense components of the angular velocity about the polar axis. The X gyro, pointed north, senses the polar axis velocity multiplied by the cosine of the latitude. The Z— gyro, pointed vertical, detects the polar axis velocity multiplied by minus the sine of the latitude. When the Y— gyro is properly oriented to east, it senses only the minus rate of change of latitude $$\frac{d(Lat.)}{dt}$$

*Conclusion*

The invention as described herein provides essential input data for the solution of the navigational problem. The apparatus associated with the support member 50 indicates the vertical and a specific azimuth (east). The apparatus associated with the frame member 10 (Fig. 4) indicates longitude and latitude.

The invention, therefore, comprises a self-monitoring system that seeks out latitude as a physical reference, and in its simplest and best presently known form operates to orient a member (10) with respect to the horizontal and the east direction and to measure the earth's angular velocity about lines in the meridian plane. It will be understood that the latitude reading is precise only when the gyrocompass gives a precise indication of azimuth. In all gyrocompasses there is an inherent error when the vessel has a component of north or south velocity, and the gyrocompass will not, without compensation, indicate true geographical east. Hence the indicated polar axis $I_{30}$ will not be parallel to the earth's axis, but will point in the direction of the resultant angular velocity of the vessel in space. This resultant is made up of two components, first, the earth's rotation about its axis, and second, the rate of change of latitude of the vessel. As previously explained, the latitude readings afford an immediate means of correcting the error in azimuth. This effect on the latitude reading itself may be removed by setting the supports 12 with respect to the table 50 so that the axis of the frame lies east and west; such a setting would also remove any longitude error arising from the inherent gyrocompass error. However, for moderate north and south velocities, the errors in latitude and longitude due to the gyrocompass error are small and may usually be neglected.

Having thus described our invention, we claim:

1. Navigational apparatus comprising a latitude gimbal rotatable about an axis, means for stabilizing the gimbal axis in a horizontal and east-west direction, a single-degree-of-freedom gyroscopic unit mounted on the gimbal and having a wheel, a frame in which the wheel rotates about a spin axis, a case for the gyroscopic unit, means for supporting the frame in the case for deflections of the frame about an output axis perpendicular to the spin axis, the gyroscopic unit having an input axis perpendicular to both the spin and the output axes, and being mounted on the gimbal with the input axis perpendicular to the gimbal axis, whereby the gyroscopic unit senses a component of earth's rotation if the input axis is not perpendicular to the earth's axis, a signal generator to generate a signal dependent on the deflection of the frame about the output axis from a null position, a drive for the gimbal about its axis, and means controlled by said generated signal to operate the drive to rotate the gimbal to a position in which the signal is nulled, whereby the gimbal position is an indication of latitude.

2. Apparatus according to claim 1, in which the latitude gimbal carries a longitude shaft rotatable about an axis perpendicular to the latitude gimbal axis, whereby the longitude shaft axis is parallel to the earth's axis when the latitude gimbal is correctly positioned, a single-degree-of-freedom longitude gyroscopic unit also having a wheel, a frame and a case and mounted with its input axis coincident with the shaft axis, whereby the longitude gyroscopic unit senses rotation about the earth's axis, a signal generator to generate a signal which varies with deflection of the frame of the longitude gyro, a drive motor for the longitude shaft about its axis, means controlled by said generated signal to operate the drive motor to rotate the longitude shaft to a position in which the signal is nulled, a sidereal time drive for the longitude shaft to remove the effect of the earth's rotation, whereby the longitude shaft position is an indication of the change of longitude from an arbitrary starting position.

References Cited in the file of this patent

UNITED STATES PATENTS

| Number | Name | Date |
|---|---|---|
| 844,837 | Vanzini | Feb. 19, 1907 |
| 1,086,242 | Sweeny | Feb. 3, 1914 |
| 1,253,666 | Carrie | Jan. 15, 1918 |
| 1,685,762 | Sparling | Sept. 25, 1928 |
| 2,046,998 | Boykow | July 7, 1936 |
| 2,109,283 | Boykow | Feb. 22, 1938 |
| 2,242,291 | Lyman | May 20, 1941 |
| 2,414,291 | Evans | Jan. 14, 1947 |
| 2,524,756 | Braddon et al. | Oct. 10, 1950 |
| 2,591,697 | Hays | Apr. 8, 1952 |